United States Patent
Qasymeh et al.

(10) Patent No.: US 11,294,259 B2
(45) Date of Patent: *Apr. 5, 2022

(54) FREQUENCY-TUNABLE QUANTUM MICROWAVE TO OPTICAL CONVERSION SYSTEM

(71) Applicant: Abu Dhabi University, Abu Dhabi (AE)

(72) Inventors: Montasir Yousof Abdallah Qasymeh, Abu Dhabi (AE); Hichem El Euch, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,425

(22) Filed: Nov. 1, 2020

(65) Prior Publication Data
US 2021/0048727 A1  Feb. 18, 2021

Related U.S. Application Data

(63) Continuation of application No. 16/373,605, filed on Apr. 2, 2019, now Pat. No. 10,824,048.

(51) Int. Cl.
*G02F 1/355* (2006.01)
*G02F 1/35* (2006.01)

(52) U.S. Cl.
CPC .............. *G02F 1/355* (2013.01); *G02F 1/353* (2013.01)

(58) Field of Classification Search
CPC ................................. G02F 1/353; G02F 1/355
See application file for complete search history.

(56) References Cited

U.S. PATENT DOCUMENTS

| 8,805,148 | B2* | 8/2014 | Avouris | G02B 6/10 |
| | | | | 385/131 |
| 10,121,932 | B1* | 11/2018 | Torres, Jr. | H05B 33/14 |
| 10,824,048 | B2* | 11/2020 | Qasymeh | G02F 1/355 |
| 2016/0227639 | A1* | 8/2016 | Kaminer | H05H 3/00 |
| 2017/0199443 | A1* | 7/2017 | Vermeulen | G02F 1/3501 |

FOREIGN PATENT DOCUMENTS

CN  203444187 U  *  2/2014  ............... G02F 1/01

* cited by examiner

*Primary Examiner* — Daniel Petkovsek (57) ABSTRACT

A electronic method, includes receiving, by a graphene structure, a microwave signal. The microwave signal has a driving voltage level. The electronic method includes generating, by the graphene structure, optical photons based on the microvolts. The electronic method includes outputting, by the graphene structure, the optical photons.

15 Claims, 12 Drawing Sheets

FREQUENCY-TUNABLE QUANTUM MICROWAVE TO OPTICAL CONVERSION SYSTEM

BACKGROUND

There are several techniques that couple quantum photonics and quantum microwave systems. This includes atomic interface techniques, opto-mechanical techniques, and electro-optic (EO) techniques. For example, EO techniques provide for wide operation bandwidths which are tunable and scalable. This allows the EO technique to modulate an optical input pump by a driving microwave signal which also generates an upper and lower sideband. The lower sideband creates noise upon the conversion process as the conversion of a pump photon into a lower side band photon may generate a microwave photon. To minimize noise, a single sideband (SSB) scheme is implemented. However, in such EO techniques, large microwave voltages (e.g., millivolts) are required to conduct the microwave-to-optical conversion. While, high Q-factor resonators may be used to enhance the EO techniques, such resonators limit the tenability of the conversion process. Currently, there is no effective technique that uses voltages less than millivolts which also reduces noise to conduct optimal microwave-to-optical conversion.

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may provide for conversion of microwave signals to optical photons using a multilayer graphene structure design as a tunable modulator. In embodiments, graphene layers (e.g., in a graphene structure) are electronically connected and pumped by an optical field. In embodiments, a driving microwave signal modulates the optical input pump. In embodiments, upper and lower sidebands are generated. In embodiments, to generate low noise conversion, the lower sideband is suppressed by the multilayer graphene destruction resonance which is a function of the graphene structure design. Accordingly, the quantity of photons generated from a lower quantity of microwave signals is increased. Also, a frequency-tunable operation is also attained over a vast frequency range (e.g., 1 to 60 GHz (gigahertz)) by modifying the optical frequency range. Additionally, the graphene structure may allow for reduced pump intensity levels (e.g., $10^8$ $v_0^2/g^2$), quantum driving voltages, and large signal-to-noise ratios (SNR).

As such, a more efficient micro-wave-to-optical conversion is described herein. In embodiments, the graphene layers, within a graphene structure, are connected in an interdigital configuration and, electrically, function as a capacitor and, optically, as a periodic medium. In embodiments, a destruction resonance of the medium is fixed by setting it a particular value and the values of the optical pump frequency and the microwave signal are varied. In embodiments, such values results in the lower sideband frequency to be at the destruction resonance value. Thus, for the described methods, structures, and systems, at greater rates of conversion of microwave-to-optical is achieved with (1) low driving voltages (e.g., 1 to 10 microvolts), (2) reasonable optical pumping, and (3) a greater frequency bandwidth.

In embodiments, various analyses are conducted to determine the improved conversion rate when using the multilayer graphene structure as a quantum modulator, This includes: (1) determining the conversion rate based on the microwave frequency for different electron densities, (2) determining the conversion rate based on the microwave driving voltage, (3) determining the conversion rate based on the optical pump amplitude and the multilayer graphene length, and/or (4) determining conversion rate with decaying optical and microwave fields. Thus, an improved conversion rate of the number of converted photons from the microwave input occurs with a graphene structure that has lower microwave driving voltages, a smaller graphene length, wider microwave frequency range, and reasonable pump amplitudes.

Figure 1:
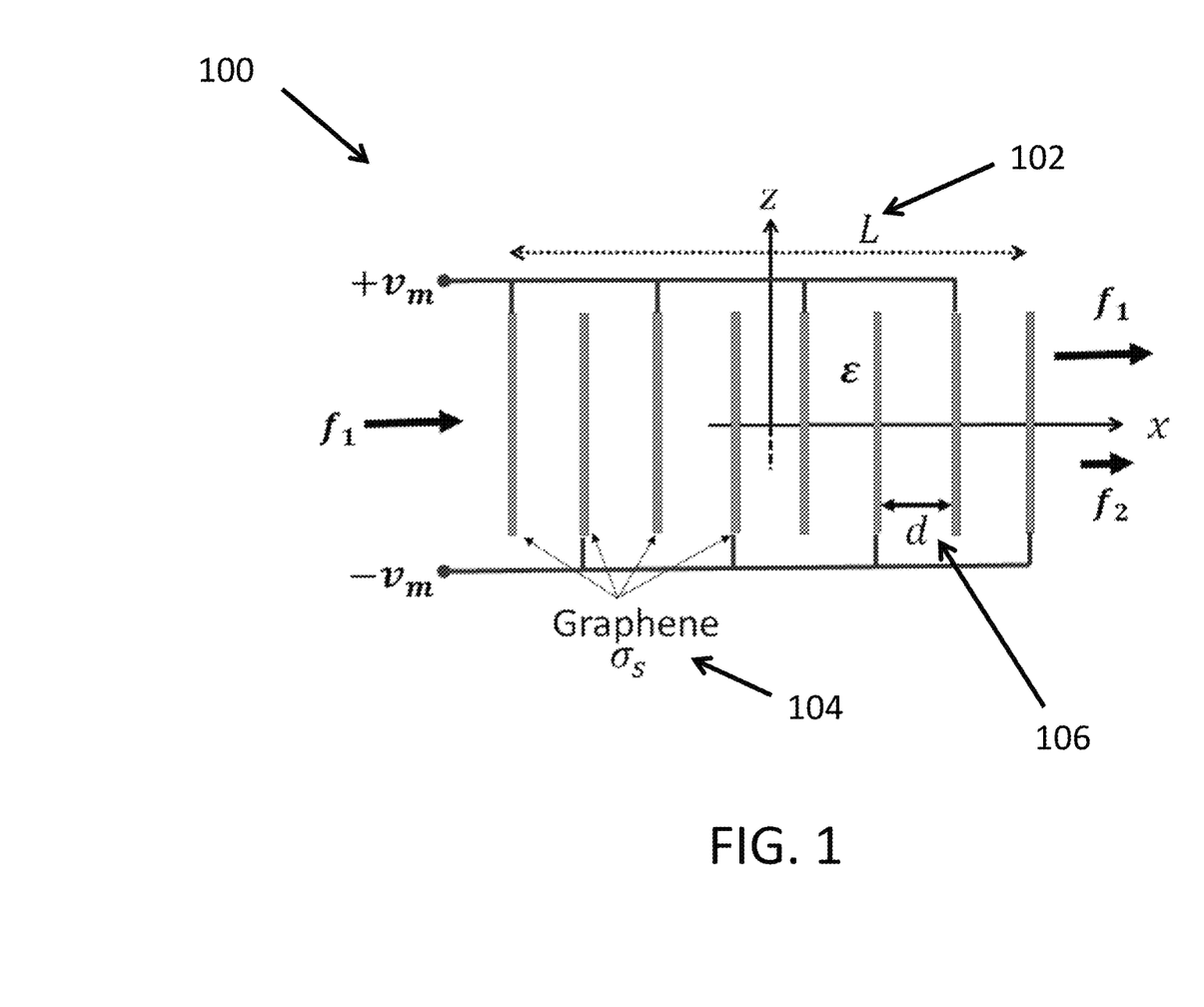
FIG. 1 is a diagram of an example model graphene structural design.

FIG. 1 describes an example design for graphene structure 100. In embodiments, graphene structure 100 is electrically driven by a microwave signal of frequency $f_m$ and subjected to an optical input pump of frequency f1 as shown in FIG. 1. In embodiments, graphene structure 100 is connected in an interdigital configuration and an optical input pump is applied normally to the graphene layers within graphene structure 100 and propagates in the direction of the x axis with a total length 102. In embodiments, each layer 104 within graphene structure 100 is located a distance 106 from each other layer 104.

Figure 2:
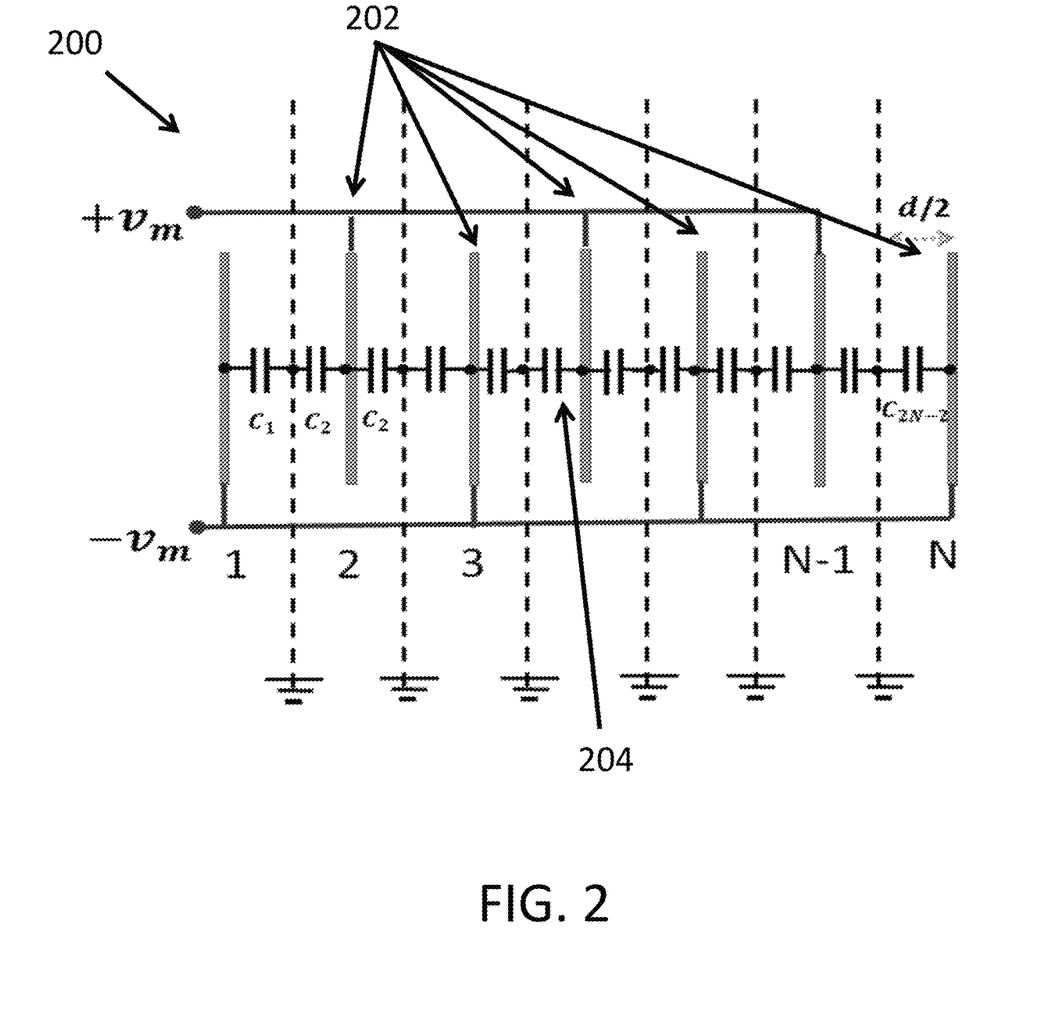
FIG. 2 is a diagram of an example model capacitance design.

FIG. 2 describes an example model capacitance design 200. In embodiments, capacitance design 200 may be associated with graphene structure 100 described in FIG. 1 and model graphene structure 100 as a capacitor. In embodiments, a particular number of identical graphene layers 202 (e.g., "N" number) can be conceived as 2N−2 shunted identical capacitors 204 (each of capacitance $C=2^{\epsilon 0\epsilon/d}$) as shown in FIG. 2. Here c is the permittivity of the filling material. In embodiments, the total capacitance (per unit area) is given by $CT=(2N-2)C=4(N-1)\epsilon 0/\epsilon$.

In embodiments, to determined modulated optical conductivity, a multilayer graphene structure (e.g., graphene structure 100) can be modeled by the means of effective permittivity. In embodiments, the graphene conductivity is conducted by both interband and intraband mechanisms, given by equation 1:

$$\sigma_s = \frac{iq^2}{4\pi\hbar}\ln\left(\frac{2\mu_c-(f+i\tau^{-1})\hbar}{2\mu_c+(f+i\tau^{-1})\hbar}\right) + \frac{iq^2 K_B T}{\pi\hbar^2(f+i\tau^{-1})}\left(\frac{\mu_c}{K_B T}+2\ln\left(e^{-\frac{\mu_c}{K_B T}}+1\right)\right).$$

In embodiments, equation 1 includes one term that describes the interband conductivity and a second term represents the intraband conductivity. In embodiments, q is the electron charge, n is the plank's constant, $\tau$ is the scattering relaxation time, KB represents the Boltzman constant, T is the temperature, f is the frequency, and $\mu_c$ expresses the graphene chemical potential. In embodiments, the operation temperature is considered at the cryogenic level (e.g., 3 milli-Kelvin). In embodiments, the graphene conductivity at a cryogenic-level temperature is dominated by the interband mechanism, while the intraband converge to Drude model.

In embodiments, a graphene chemical potential is given by equation 2 as:

$$\mu_c = \hbar V_f \sqrt{\pi n_0 + \frac{2C_T}{q} v_m,}.$$

In embodiments, where $n_0$ is the electron density per unit area, $V_f$=106 m/s, which is the Fermi velocity of the Dirac fermions, and $v_m$ is the driving microwave voltage, defined by equation 3 (where fm is the microwave frequency and c.c. is a complex conjugate):

$$v_m = v e^{-2\pi f_m t} + c.c.$$

In embodiments, the microwave voltage in equation 3 is substituted in equation 2. Furthermore, using the approximation $(1+\chi)^{1/2} \approx 1+\chi$ for $\chi \ll 1$, the chemical potential for $2CT\, v \ll \pi n0 q$, can be determined in equation 4 as:

$$\mu_c = \mu_c' + v\mu_c'' e^{-2\pi f_m t} + c.c.$$

where $$\mu_c' = \hbar V_f \sqrt{\pi n_0}, \text{ and } \mu_c'' = \hbar V_f \frac{C_T}{q\sqrt{\pi n_0}}.$$

In embodiments, substituting the chemical potential in equation 4 into the conductivity portion of equation 1 substituting the chemical potential in equation 4 into the conductivity expression in Eq. (1), and for $v\mu_c'' \ll \mu_c'$, the graphene's conductivity can be approximated up to the first order as equation 6:

$$\sigma_s = \sigma_s' + v\sigma_s'' e^{-2\pi f_m t} + c.c.$$

with equations 7 and 8 are:

$$\sigma_s' = \frac{iq^2}{4\pi\hbar} \ln\left(\frac{2\mu_c' - (f + i\tau^{-1})\hbar}{2\mu_c' + (f + i\tau^{-1})\hbar}\right) + \frac{iq^2 K_B T}{\pi\hbar^2 (f + i\tau^{-1})} \left(\frac{\mu_c'}{K_B T} + 2\ln\left(e^{-\frac{\mu_c'}{K_B T}} + 1\right)\right)$$

$$\sigma_s'' = \frac{iq^2}{\pi\hbar} \frac{(f + i\tau^{-1})\hbar}{4(\mu_c')^2 - (f + i\tau^{-1})^2 \hbar^2} \mu_c'' + \frac{iq^2 K_B T}{\pi\hbar^2(f + i\tau^{-1})} \tanh\left(\frac{\mu_c'}{2K_B T}\right) \frac{\mu_c''}{K_B T},$$

and $$v\sigma_s'' \ll \sigma_s'.$$

In embodiments, the dispersion relation of a graphene structure (e.g., graphene structure 100) may be given by equation 9 (with $\beta$ is the propagation constant and $Z_0$ is the free space impedance):

$$\cos(d\beta) = \cos\left(d\sqrt{\varepsilon}\frac{2\pi f}{c}\right) - i\frac{Z_0}{2\sqrt{\varepsilon}} \sin\left(d\sqrt{\varepsilon}\frac{2\pi f}{c}\right) \sigma_s$$

Based on equation 6, the propagation constant can be given in equation 10 as:

$$\beta = \beta' + v\beta'' e^{-2\pi f_m t} + c.c.$$

In embodiments, the propagation constant from equation 10 is substituted in the dispersion relation in equation 9 and expand nonlinear terms. In embodiments, $\beta'$ may satisfy the dispersion relation in equation 9 with $\sigma_s'$ in lieu of $\sigma_s$. In embodiments, $\beta''$ may be given by equation 11:

$$\beta'' = i\frac{Z_0}{2d\sqrt{\varepsilon}} \frac{\sin\left(d\frac{2\pi f \sqrt{\varepsilon}}{c}\right)}{\sin(d\beta')} \sigma_s''.$$

Thus, based on equation 11, the effective permittivity of the graphene structure is given by equation 12:

$$\varepsilon_{eff\,j} = \varepsilon_{eff\,j}' + v\varepsilon_{eff\,j}'' e^{-i2\pi f_m t} + c.c.$$

and where equation 13 is:

$$\varepsilon_{eff\,j}' = \left(\frac{\beta_j'}{k_{0_j}}\right)^2, \text{ and } \varepsilon_{eff\,j}'' = 2\frac{\beta_j' \beta_j''}{k_{0_j}^2}$$

In embodiments, as shown in equation 12, the microwave signal modulates the effective permittivity of the graphene structure. In embodiments, the upper and lower sidebands are generated with frequencies f2=f1+fm and f3=f1−fm, respectively. In embodiments, the destruction resonance of the multilayer graphene occurs at f3 so that the lower side band is suppressed to the maximum level. Thus, the spontaneous process is minimized. In embodiments, the group velocity at the destruction resonance frequency is set at zero, similar to the reflection resonance for externally incident optical waves. However, in the current scenario there are no reflected waves as the lower side band is generated within the graphene layers and the layered medium is reciprocal. As such, the lower sideband is suppressed by setting $d=c/(f_3(\varepsilon)^{1/2})$. In embodiments, a medium transmittance may be determined to quantify the suppression of the lower sideband. Thus, optical fields in the graphene structure are given by equation 14 (with $u_j$ is the slow varying amplitude and $j \in \{1, 2\}$ as:

$$\vec{E}_j = u_j \left(e^{-i2\pi f_j t + i\beta_j' x} + c.c.\right) \hat{e}_y.$$

In embodiments, a classical Hamiltonian for equation 15:

$$\mathcal{H} = \frac{1}{2} \int_V \left(\varepsilon_0 \varepsilon_{eff} |\vec{E}_t|^2 + \mu_0 |\vec{H}_t|^2\right) \partial V$$

In embodiments, $E_t$ is the total electric field, $H_t$ represents the total magnetic field, and V is the volume. In embodiments, the Hamiltonian in equation 15 describes the total electromagnetic energy of the system. In embodiments, the first part represents the total electric field taking into account the effective permittivity, as described in equation 12. In embodiments, the second part of equation 15 takes into account the magnetic energy, while the system of the graphene structure has zero magnetic susceptibility. In embodiments, the effective permittivity is approximated by implementing a perturbation approach considering a weak driving microwave voltage (e.g., ranging from 1 to 10 microvolts). Accordingly, the chemical potential (represented by its expansion) can be approximated up to the first order. This is validated by imposing the condition 2CTvπn0q. Consequently, the graphene conductivity, and the effective permittivity can be approximated up to the first order. This approach is verified when numerical calculations are carried out. In embodiments, substituting the expressions of the propagating fields in equation 14 into the Hamiltonian expression in equation 15, and using the effective permittivity in equation 12, the Hamiltonian expression can be rewritten as 2CTv<<πn0q.

In embodiments, the graphene conductivity, and the effective permittivity can be approximated up to the first order. In embodiments, substituting the expressions of the propagating fields in equation 14 into the Hamiltonian expression in equation 15, and using the effective permittivity in equation 12, the Hamiltonian expression can be rewritten as equation 16:

$$\mathcal{H} = \mathcal{H}_0 + \mathcal{H}_1,$$

where equation 17 is:

$$\mathcal{H}_0 = \mathcal{V} \sum_{j=1}^{2} \varepsilon'_{\mathit{eff}_j} \varepsilon_0 u_j^* u_j + c.c.$$

And equation 18 is:

$$\mathcal{H}_1 = \mathcal{V} \varepsilon''_{\mathit{eff}_2} \varepsilon_0 u_1^* v^* u_2 + c.c.$$

In embodiments, as shown in equation 18, $H_0$ are the classical free fields Hamiltonian and $H_1$ is the classical interaction Hamiltonian. In embodiments, these expressions are used to describe the quantum evolution of the interacting fields.

In embodiments, the optical and microwave fields can be quantized through the following relations (equation 19a and equation 19b):

$$u_j = \left(\frac{\hbar f_j}{\varepsilon'_{\mathit{eff}_j} \varepsilon_0 \mathcal{V}}\right)^{\frac{1}{2}} \hat{a}_j, \text{ and } v = \left(\frac{\hbar f_m}{C_T \mathcal{A}}\right)^{\frac{1}{2}} \hat{b}$$

In embodiments, where $\hat{a}_j$ and $\hat{b}$ are the annihilation operators of the jth optical mode and the microwave mode, respectively. In embodiments, the quantum Hamiltonian can be obtained by substituting the annihilation (and creation) operators, defined above, into the classical Hamiltonian in equation 16, yielding equation 20:

$$\hat{\mathcal{H}} = \hat{\mathcal{H}}_0 + \hat{\mathcal{H}}_1,$$

where equation 21 is:

$$\hat{\mathcal{H}}_0 = \hbar f_m \hat{b}^\dagger \hat{b} + \hbar f_1 \hat{a}_1^\dagger \hat{a}_1 + \hbar f_2 \hat{a}_2^\dagger \hat{a}_2,$$

and equation 22 is:

$$\hat{\mathcal{H}}_1 = \hbar g(\hat{a}_2^\dagger \hat{b} \hat{a}_1 + h.c.)$$

In embodiments, where h.c. is the Hermitian conjugate and g is the conversion rate given by equation 23:

$$g = \varepsilon''_{\mathit{eff}_2} \sqrt{\frac{f_1 f_2}{\varepsilon'_{\mathit{eff}_1} \varepsilon'_{\mathit{eff}_2}}} \sqrt{\frac{\hbar f_m}{C_T \mathcal{A}}}$$

In embodiments, substituting quantum Hamiltonian expression of equation 20 into Heisenberg equations of motions that yield equations 24, 25, and 26:

$$\frac{\partial \hat{a}_1}{\partial t} = -i f_1 \hat{a}_1 - i g \hat{b}^\dagger \hat{a}_2$$

$$\frac{\partial \hat{a}_2}{\partial t} = -i f_2 \hat{a}_2 - i g \hat{b} \hat{a}_1$$

$$\frac{\partial \hat{b}}{\partial t} = -i f_m \hat{b} - i g \hat{a}_1^\dagger \hat{a}_2$$

In embodiments, In this work, the optical pump input $\hat{a}_1$ is considered intensive and treated classically. In embodiments, on using the rotation approximation:

$$(\hat{a}_j = \hat{A}_j e^{-i\omega_j t} \text{ and } \hat{b} = \hat{B} e^{-i\omega_M t}).$$

the equations of motion are given by equations 27 and 28 as:

$$\frac{\partial \hat{A}_2}{\partial t} = -i g A_1 \hat{B}$$

$$\frac{\partial \hat{B}}{\partial t} = -i g A_1^* \hat{A}_2$$

In embodiments, the solutions of equations 27 and 28 are given by equation 29:

$$\hat{A}_2(t) = \hat{A}_2(0)\cos(g|A_1|t) - i e^{-i\varphi_0} \hat{B}(0)\sin(g|A_1|t)$$

In embodiments, $\varphi_0$ is the phase of the optical input A1. In embodiments, using, equation 29, if the interaction time satisfies equation 30:

$$g|A_1|t = \frac{\pi}{2}$$

Where the upper sideband is $$\hat{A}_2,$$

And the microwave signal is $$\hat{B}$$

Such that the quantum state of the optical upper sided band depends only on the state of the microwave signal, thus achieving a quantum microwave-to-optical conversion.

Figure 3:
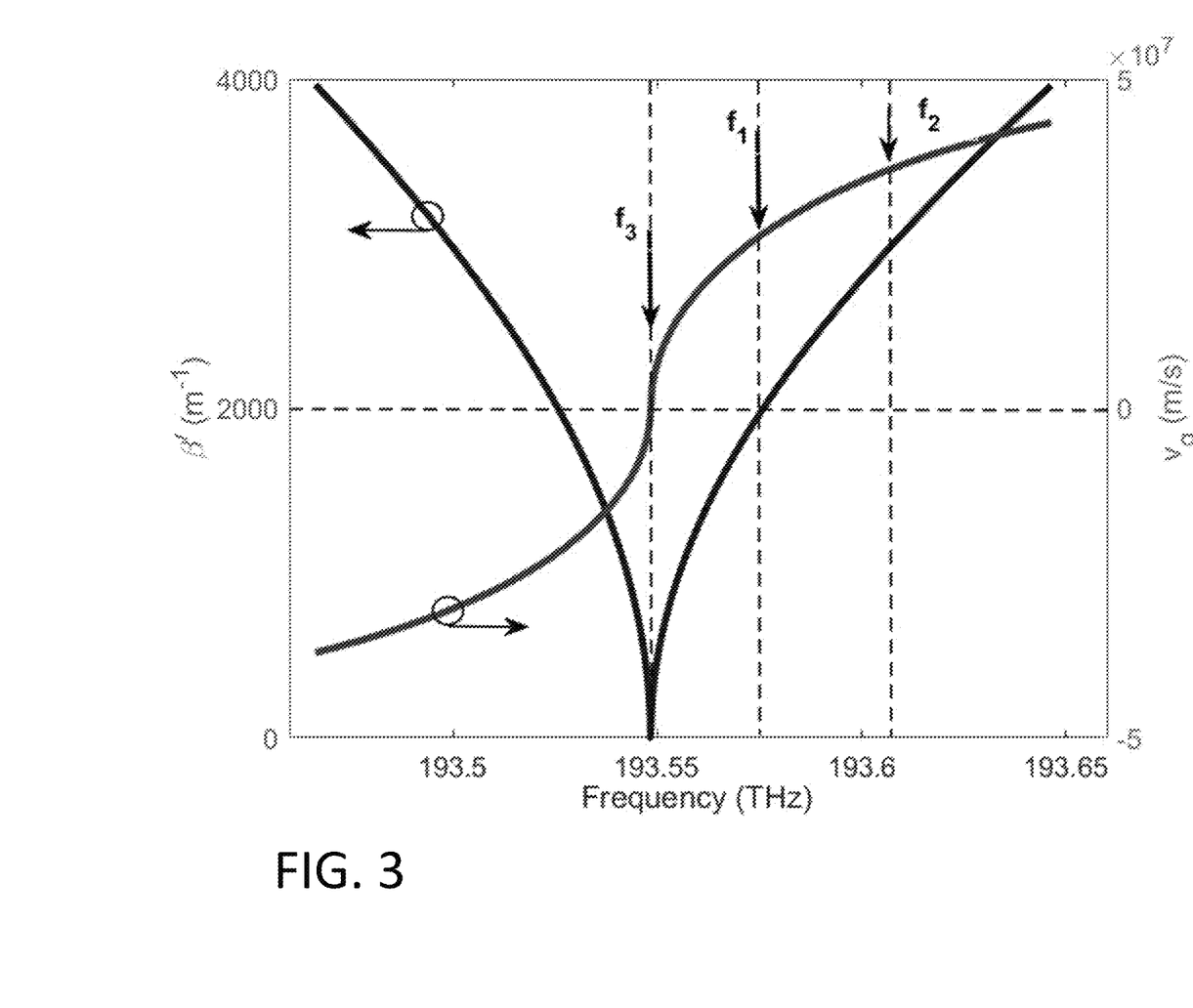
FIGS. 3 and 4 are example electronically generated graphs.
Figure 4:
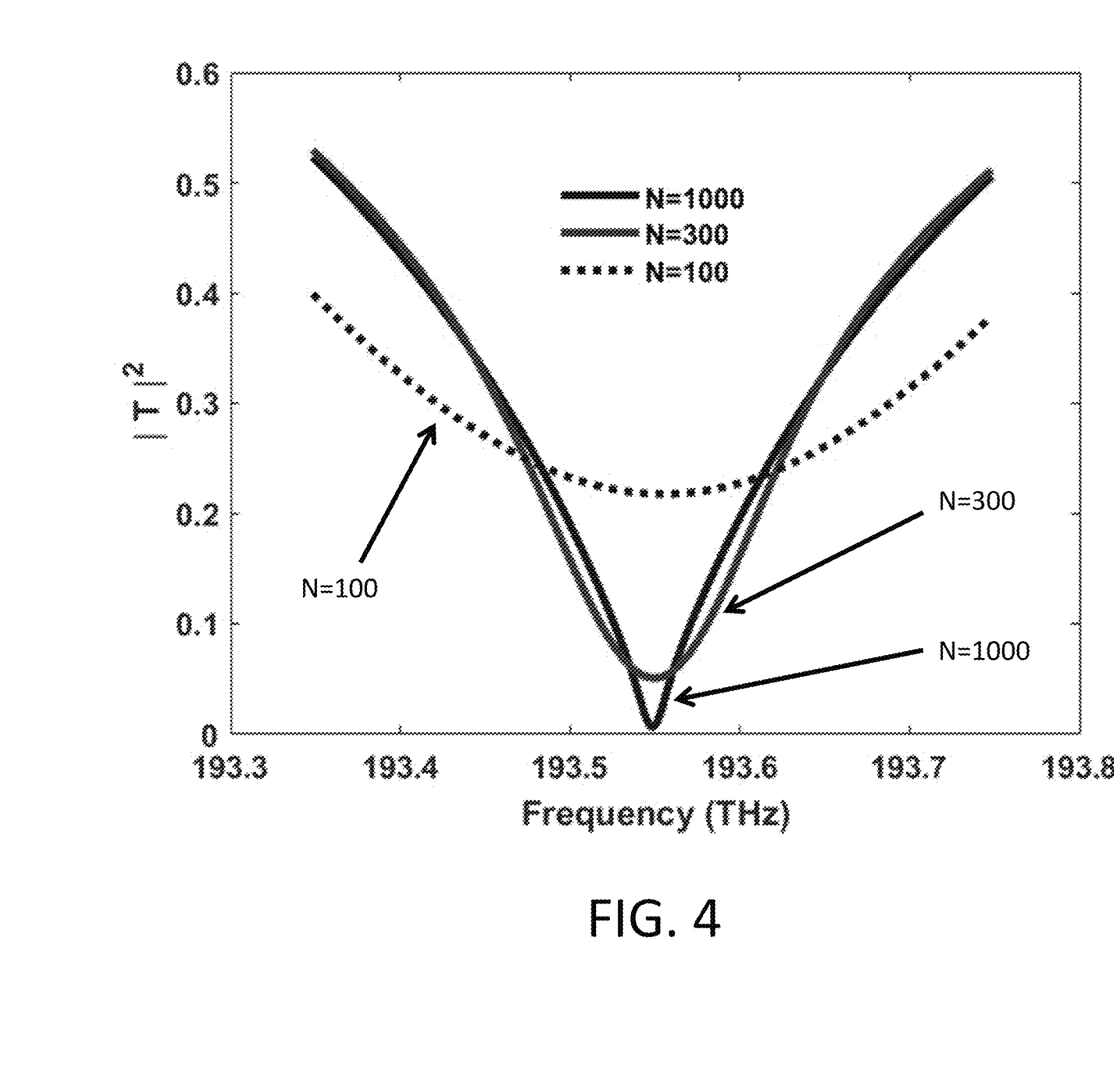

FIGS. 3 and 4 show example electronic graphs of numerical analysis associated with equations 1 to 30. In embodiments, air is filling material, the optical lower sideband frequency is fixed at $f_3$=193.5484 THz, and the separation distance between graphene layers is given by d=1.55 μm. In embodiments, the frequency of the optical pump $f_1$ (which is between $f_2$ and $f_3$) and the microwave signal frequency fm are varied accordingly. In embodiments, the area of the graphene layers is 1 mm².

In embodiments, the propagation constant (and the group velocity) are calculated for the graphene structure. In embodiments, the transmittance T of the medium is simulated (e.g., using the transfer matrix method) to quantify the suppression of the lower sideband and an extraction ratio is calculated. As shown in FIG. 3, the propagation constant and the group velocity (i.e., $v_g$) are shown versus optical frequency. An example of $f_1$, $f_2$, and $f_3$ are shown for $f_m$=50 GHz. Here, $v_g$ is defined by:

$$v_g = \frac{\partial f}{\partial \beta}$$

As shown in FIG. 4, the transmittance is displayed versus the optical frequency, considering different numbers of graphene layers. The extraction ratio between the upper and lower side bands can be defined as:

$$\eta_E = \frac{T^2(N)|_{f=f_3}}{T^2(N)|_{f=f_2}}$$

As further shown in FIG. 4, the number of layers is needed to reach a reasonable extraction ratio is shown. For example, for fm=50 GHz, the extraction ratio equals $\eta E$=1.1 for N=100, $\eta E$=3 for N=300, and $\eta E$=32 for N=1000.

Figure 5:
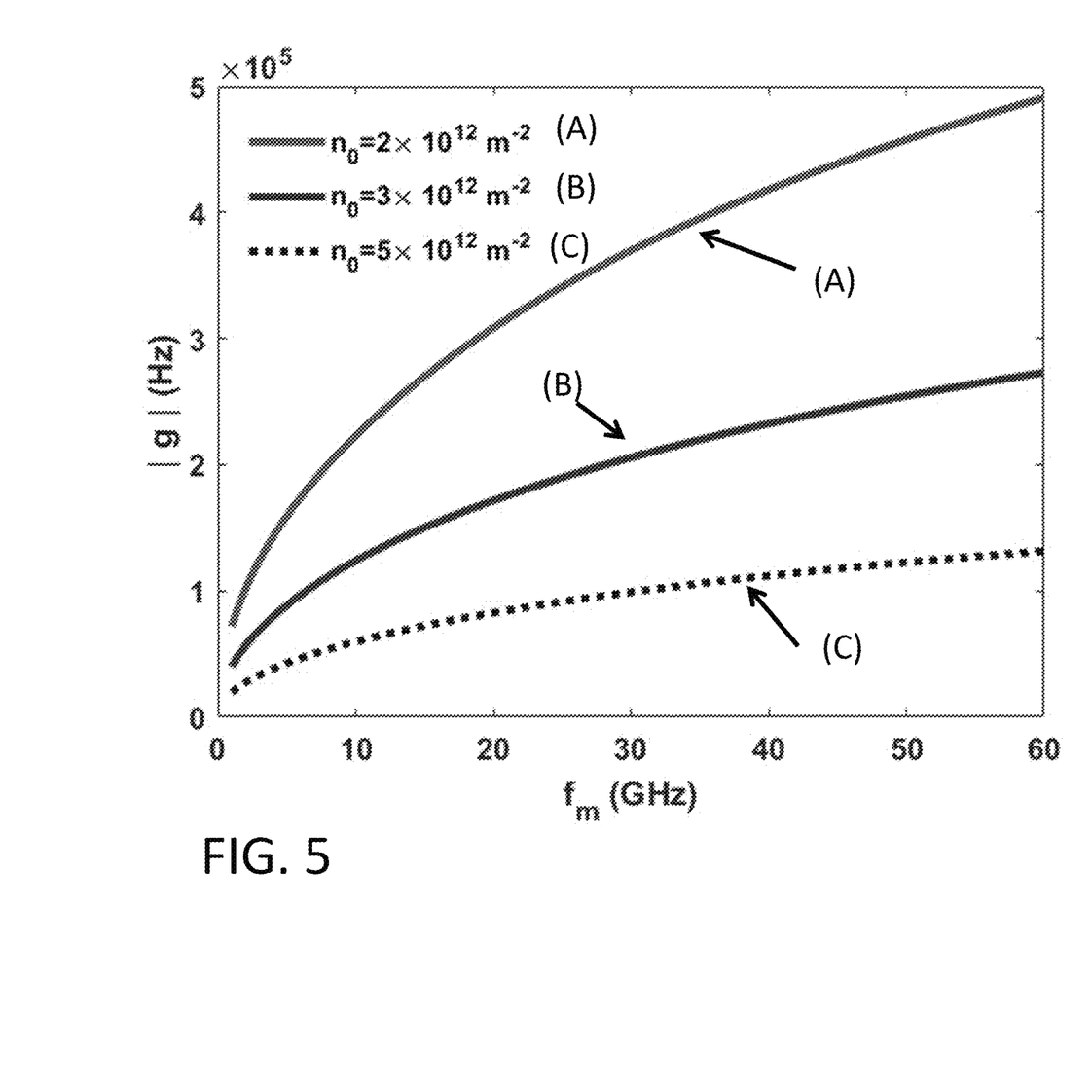
FIGS. 5 and 6 are example electronically generated graphs.

In embodiments, the conversion rate is characterized using different parameters including the drive microwave voltage, the microwave frequency, the electron densities, and the medium length. As shown in FIG. 5, the conversion rate g is evaluated versus the microwave frequency. Here, N=1000, $v$=1 µV, and different electron densities $n_0$ are considered. Higher conversion rates can be achieved for smaller electron densities. In embodiments, the electron density may satisfy a threshold value given by $2C_T v \ll \pi n_0 q$. As shown in FIG. 5, (A) is $n_0$=2×10$^{12}$ m$^{-2}$, (B) is $n_0$=3×10$^{12}$ m$^{-2}$, and (C)=$n_0$=5×10$^{12}$ m$^{-2}$.

Figure 6:
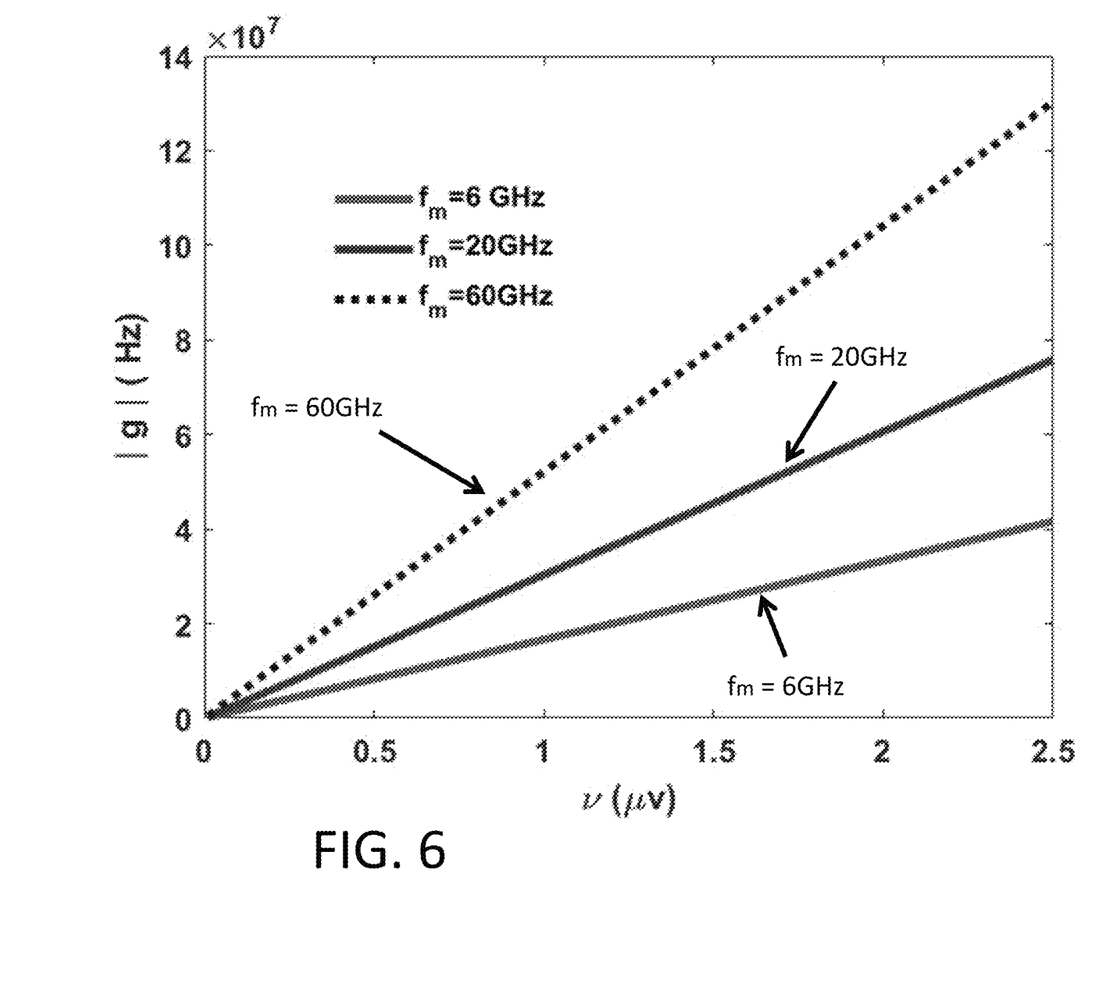

In FIG. 6, the conversion rate is shown versus the driving microwave voltage. Here, N=1000, and $n_0$=2×10$^{12}$ m$^{-2}$. Significant conversion rates can be achieved for microvolt ranges. This is due to the dispersion property of the multilayer graphene and to the significant variation of the graphene conductivity in response to even very small driving electric voltages.

In embodiments, the length of the multilayer graphene medium is given by L=(N−1)d. Consequently, by using t=L 1/$v_g$ in equation 30, the required optical pump amplitude is shown by equation 31 as:

$$|A_1| = \frac{\pi v_g}{2L|g|}$$

Figure 7:
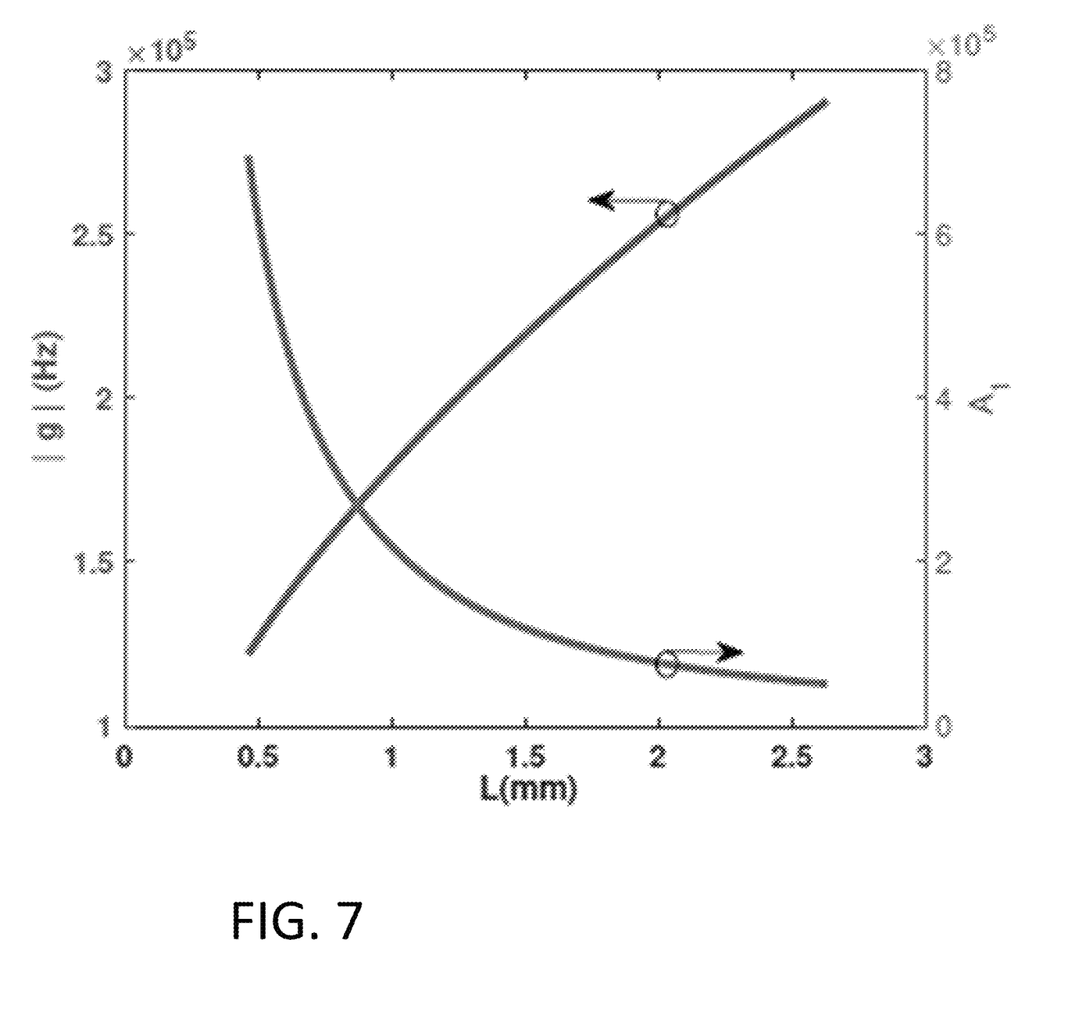
FIG. 7 is an example electronically generated graphs.

In FIG. 7, the conversion rate g is displayed versus the graphene medium length L and the pump amplitude $A_1$. As can be seen, significant conversion rates can be achieved for few propagated millimeters, yet with reasonable pump amplitudes.

In embodiments, equations of motion in equations 27 and 28 describe a closed-quantum system. However, both the optical and the microwave fields decay with time. In embodiments, optical decay is attributed to attenuation and reflection of the multilayer graphene, modeled by including the time decay parameter F in the equations of motion. The attenuation optical time decay rate is defined by:

$$\Gamma_A = 2\nu Im(\beta).$$

In embodiments, the reflection of the multilayer graphene may be modeled by an equivalent decay coefficient $\Gamma_R$. This decay coefficient (we called it reflection decay coefficient) can be defined by setting $\exp(-t_0 \Gamma_R) = T_0^2$. In embodiments, $T_0$ is transmittance of a single block of the multilayer graphene (composed of d filling material and a single graphene layer), and $t_0 = d/v_g$ is the total flight time over a single block.

In embodiments, given that v and b̂ are linearly related as shown in equation 19, modelling the microwave decay rate is conducted. First, the microwave rms power losses is calculated by $v^2/2R_g$ where $R_g$=Re(1/$\sigma_s$) is the graphene resistance for a square layer. Here, the graphene conductivity is calculated at the microwave frequency and T=3 mK.

Second, the microwave energy at a time, let us say $t_0$, is approximated as the initial energy at time t=0 minus the rms dissipated energy, that is:

$$qv - \frac{v^2}{2R_g} t_0$$

In embodiments, the effective microwave decay rate $\Gamma m$ is introduced to calculate the microwave energy at the same time $t_0$, yielding:

$$qv - \frac{v^2}{2R_g} t_0 = qv e^{-\frac{\Gamma m}{2} t_0}$$

It then follows:

$$\Gamma m = -\frac{2}{t_0} \ln\left(1 - \frac{v t_0}{2q R_S}\right)$$

Figure 8:
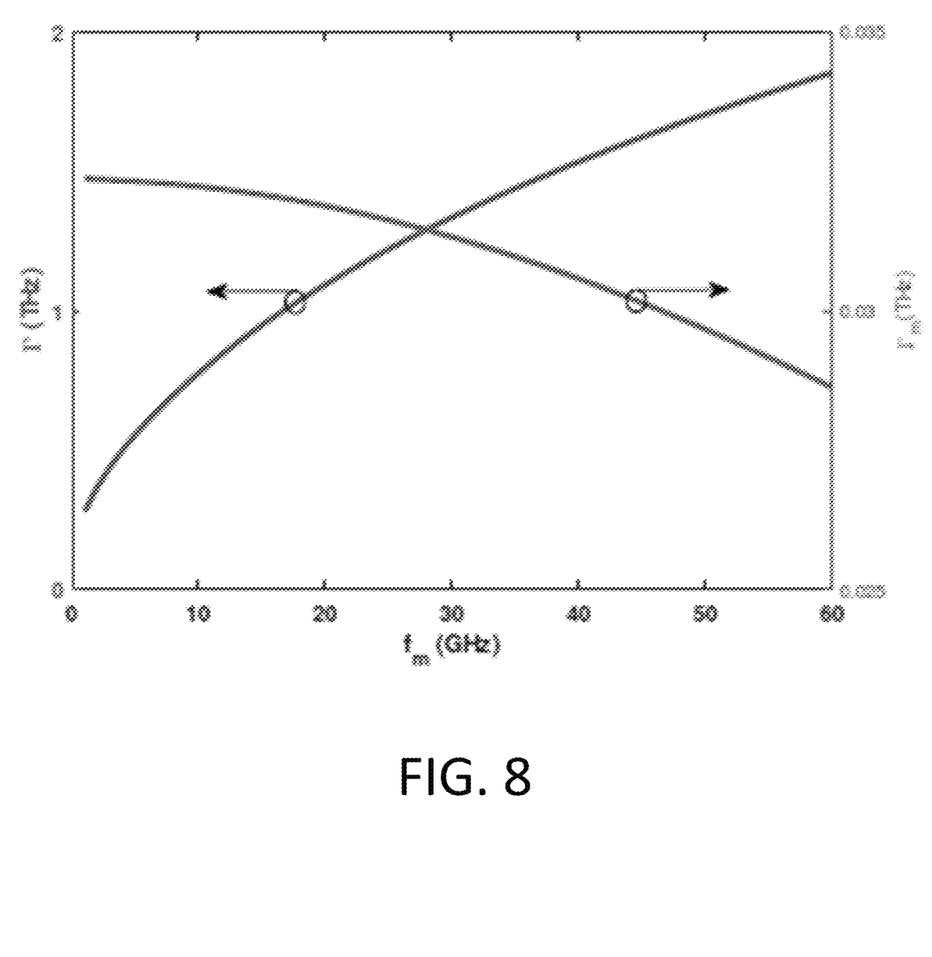
FIGS. 8 and 9 are example electronically generated graphs.

We note here that $\Gamma m$ depends on the applied voltage amplitude as the electrical dissipation is a nonlinear process. In FIG. 8, the optical and the microwave decay time rates are presented versus the microwave frequency. Here, f3 is fixed at the destruction resonance, and f1 is adjusted in accordance to fm, as f1=f3+fm, n0=2×1012 m-2, and v=1 µv. Accordingly, the motions of equations (equations 32 and 33):

$$\frac{\partial \hat{A}_2}{\partial t} = -\frac{\Gamma}{2} \hat{A}_2 - ig A_1 \hat{B} + \sqrt{\Gamma} N_2,$$

$$\frac{\partial \hat{B}}{\partial t} = -\frac{\Gamma_m}{2} \hat{B} - ig A_1^* \hat{A}_2 + \sqrt{\Gamma_m} N_m,$$

where $\Gamma = \Gamma_A + \Gamma_R$ is the total optical decay coeÿcient, $\Gamma m$ represents the microwave decay coefficient, and $\Gamma R = v g/d$ ($\ln(1/T_0^2)$). Here, N2 and Nm are the quantum Langevin noise operators, obeying:

$$[N(t_1), N(t_2)^\dagger] = \delta(t_1 - t_2) \text{ and}$$

$$\langle N(t_1)^\dagger N(t_2) \rangle = \frac{1}{\exp(\hbar f / k_B T)} \delta(t_1 - t_2)$$

In embodiments, the dissipation characterized by the time decay rates $\Gamma$ and $\Gamma_m$ are included in the equations of motions (equations 32 and 33). Hence, according to the fluctuation-dissipation theorem, the Langevin forces are included. The langevin forces represent the noise in the microwave and optical frequencies as the feed-back of the environment to the system. In embodiments, squeezing between different frequency fields due to a spontaneous process is ignored. In embodiments, the reflected optical pump may be modulated by the microwave signal. In embodiments, as the layered structure is reciprocal, the reflected optical pump may operate the same dynamics as the transmitted optical pump and modulation of the side bands is neglected. Accordingly, to evaluate the number of converted photons, one may write the evolution equations for the mean optical (equation 34) and microwave (equation 35) fields:

$$\frac{\partial \langle \hat{A}_2 \rangle}{\partial t} = -\frac{\Gamma}{2} \langle \hat{A}_2 \rangle - i g A_1 \langle \hat{B} \rangle,$$

$$\frac{\partial \langle \hat{B} \rangle}{\partial t} = -\frac{\Gamma_m}{2} \langle \hat{B} \rangle - i g A_1^* \langle \hat{A}_2 \rangle$$

In embodiments, using equation 31, a complete set of differential equations describe the numbers of photon evolution. In addition, Heaviside step pump switching function H(t), the system of the differential equations can be solved and the solutions is:

$$\langle \hat{A}_2^\dagger \hat{A}_2 \rangle \quad \text{(solution x)}$$

$$\langle \hat{B}^\dagger \hat{B} \rangle \quad \text{(solution y)}$$

In embodiments, solution x may contain terms that correlate with the microwave state and others that decorrelated with microwave state. In embodiments, the signal to noise ratio (SNR) is defined as the ratio of the terms correlate with microwave state to those that decorrelated with microwave state. On imposing the condition of $$A = \left( \frac{\Gamma - \Gamma_m}{4g} \right),$$

the parameter α approaches zero which implies a large SNR. Thus, the decorrelate terms can be ignored. Accordingly, the solution x can be given as equation 36:

$$\langle \hat{A}_2^\dagger \hat{A}_2 \rangle = A g t e^{-\frac{t(\Gamma + \Gamma_m)}{4}} \langle \hat{A}_2^\dagger \hat{B} \rangle \Big|_{t=0}$$

Where $t=L/v_g$ is the interaction. In embodiments, the optical and microwave fields can be considered decorrelated at t=0 and equation 37 is:

$$\langle \hat{B}^\dagger \hat{A}_2 \rangle |_{t=0} \langle \hat{B}^\dagger \rangle |_{t=0} \langle \hat{A}_2 \rangle |_{t=0} + \sqrt{\langle \hat{A}_2^\dagger \hat{A}_2 \rangle |_{t=0} \langle \hat{B}^\dagger \hat{B} \rangle |_{t=0}}$$

In embodiments, the SNR becomes in equation 38:

$$SNR = \frac{\langle \hat{B} \rangle |_{t=0}}{\langle \hat{A}_2 \rangle |_{t=0}}$$

As shown in equation 38, the SNR is large, given that the numerator is the initial microwave expectation value of the annihilation operator, while the denominator is initially at the noise level. For example, a microwave voltage signal of v=1 μV, the SNR is greater than 30 dB.

Figure 9:
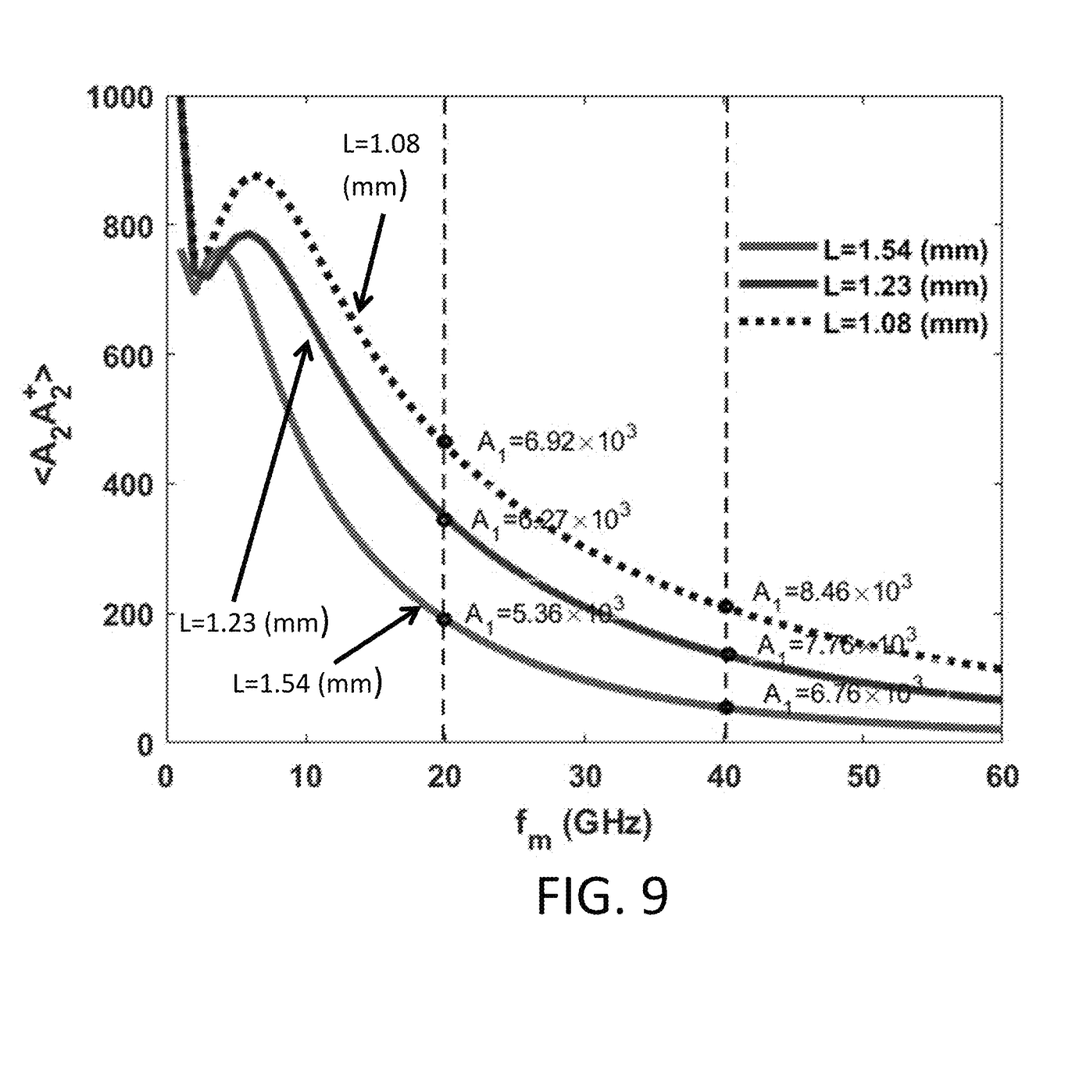

FIG. 9, is an example electronic graph that indicates the number of converted photons versus the frequency of the microwave signal. In embodiments, a significant number of optical photons are converted over a wide microwave frequency range. In embodiments, different lengths of graphene structures (with layers N) are considered. These include L=1.54 mm (i.e., N=1000), L=1.23 mm (i.e., N=800), and L=1.08 (i.e., N=700). In embodiments, a larger number of converted photons may be achieved for shorter lengths of multilayer graphene. However, in this case, larger optical pump amplitudes are required and smaller (extra)ction ratios result. For example, for 1.23 mm and 1.08 mm, respectively. The corresponding pump amplitudes are A1=5.36×10³, 6.27×10³, and 6.92×10³, while the extraction ratios are ηE=31, 20, and 16, respectively. Here, the classical slow varying field amplitude of the optical pump field, i.e., u1, can be calculated from the pump operator, i.e., A1, by equation 19.

In embodiments, as required by the developed model, u1 values are of moderate level. For example, in FIG. 9, A1=6.92×10³ for fm=20 GHz and L=1.08 mm medium length. The corresponding electric optical pump field intensity is u1=71 104 V/m. Thus, the optical pump can be safely treated classically and in the same time its intensity is below the damage threshold of graphene. In embodiments, the peak of the number of converted photons in FIG. 9 is attributed to the transmittance response of the layered media. In embodiments, the optical decay coefficient, Γ, is compressed of the absorption decay coefficient ΓA and the reflection decay coefficient ΓR. Thus, the transmittance (or equivalently the reflection) of the layer medium is dispersive and depends on the frequency of the converted photons (which is f3=f1+fm). This can be verified by comparing the transmittance response, versus fm, with the number of photons in FIG. 9.

Figure 10:
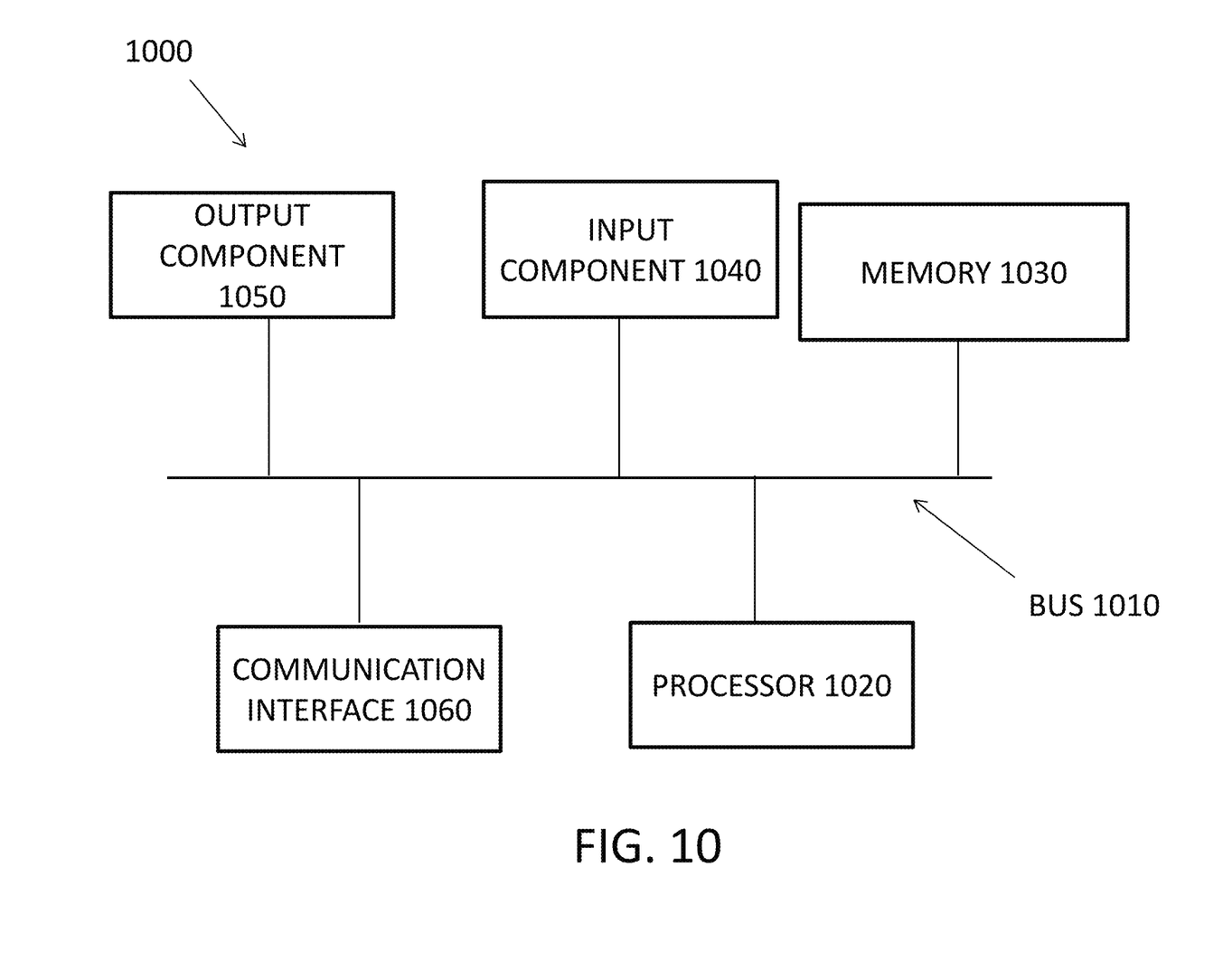
FIG. 10 is an example device.

FIG. 10 is a diagram of example components of a device 1000. Device 1000 may correspond to a computing device, such as devices 1100, 1200, and/or 1202. Alternatively, or additionally, devices 1100, 1200, and/or 1202 may include one or more devices 1000 and/or one or more components of device 1000.

As shown in FIG. 10, device 1000 may include a bus 1010, a processor 1020, a memory 1030, an input component 1040, an output component 1050, and a communications interface 1060. In other implementations, device 1000 may contain fewer components, additional components, different components, or differently arranged components than depicted in FIG. 10. Additionally, or alternatively, one or more components of device 1000 may perform one or more tasks described as being performed by one or more other components of device 1000.

Bus 1010 may include a path that permits communications among the components of device 1000. Processor 1020 may include one or more processors, microprocessors, or processing logic (e.g., a field programmable gate array (FPGA) or an application specific integrated circuit (ASIC)) that interprets and executes instructions. Memory 1030 may include any type of dynamic storage device that stores information and instructions, for execution by processor 1020, and/or any type of non-volatile storage device that stores information for use by processor 1020. Input component 1040 may include a mechanism that permits a user to input information to device 1000, such as a keyboard, a keypad, a button, a switch, voice command, etc. Output component 1050 may include a mechanism that outputs information to the user, such as a display, a speaker, one or more light emitting diodes (LEDs), etc.

Communications interface 1060 may include any transceiver-like mechanism that enables device 1000 to communicate with other devices and/or systems. For example, communications interface 1060 may include an Ethernet interface, an optical interface, a coaxial interface, a wireless interface, or the like.

In another implementation, communications interface 1060 may include, for example, a transmitter that may convert baseband signals from processor 1020 to radio frequency (RF) signals and/or a receiver that may convert RF signals to baseband signals. Alternatively, communications interface 1060 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 1060 may connect to an antenna assembly (not shown in FIG. 10) for transmission and/or reception of the RF signals. The antenna assembly may include one or more antennas to transmit and/or receive RF signals over the air. The antenna assembly may, for example, receive RF signals from communications interface 1060 and transmit the RF signals over the air, and receive RF signals over the air and provide the RF signals to communications interface 1060. In one implementation, for example, communications interface 1060 may communicate with a network (e.g., a wireless network, wired network, Internet, etc.).

As will be described in detail below, device 1000 may perform certain operations. Device 1000 may perform these operations in response to processor 1020 executing software instructions (e.g., computer program(s)) contained in a computer-readable medium, such as memory 1030, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 1030 from another computer-readable medium or from another device. The software instructions contained in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

Figure 11:
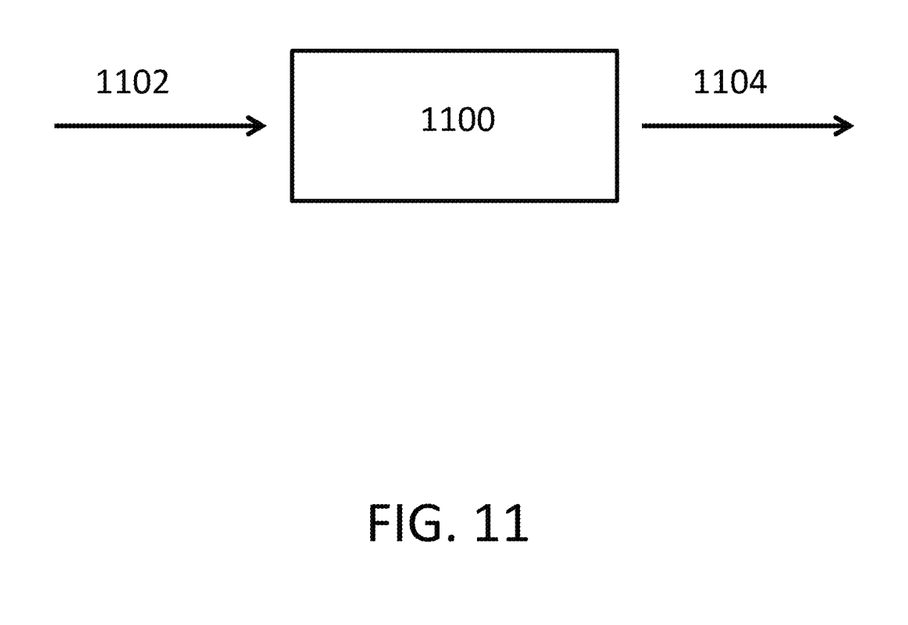
FIG. 11 is an example system.

FIG. 11 is an example diagram. FIG. 11 describes device 1100, communication 1102, and communication 1104. In embodiments, device 1100 may a computing device with features/structures similar to that described in FIG. 10. In embodiments, device 1100 may be a computing device that is part of a laptop, desktop, tablet, smartphone, and/or any other device that may receive communication 1102, analyze communication 1102, and generate output 1104 based on communication 1102. As shown in FIG. 11, communication 1102 may be received by device 1100 (e.g., via keyboard inputs, touchscreen inputs, voice inputs, etc.). In embodiments, communication 1102 may include information about a graphene structure, such as number of layers, thickness, distance between layers, electric features, dielectric features, etc. In embodiments, device 1100 may receive communication 1102 and, based on one or more of equations 1 to 38, that generate output 1104 that includes information about microwave voltage that may provide for the maximum conversion rate of the microwave fields to optical photons. In alternate embodiments, device 1100 may include a mechanism that receives communication 1102 and generates microwave voltage as part of output 1104.

Figure 12:
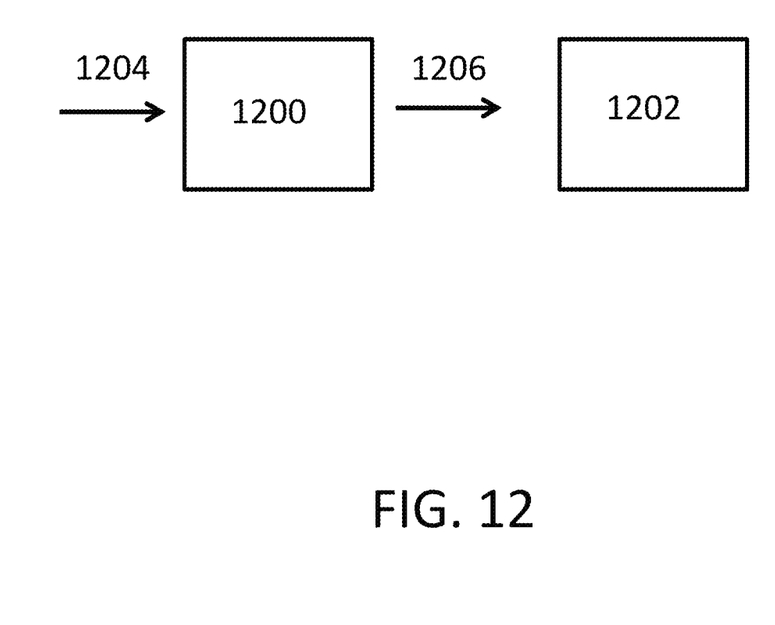
FIG. 12 is an example system.

FIG. 12 is an example diagram. FIG. 12 describes device 1200, device 1202, input 1204, and output 1206. In embodiments, device 1200 may a computing device with features/structures similar to that described in FIG. 12. In embodiments, device 1200 may be a computing device that is part of a laptop, desktop, tablet, smartphone, and/or any other device that may receive communication 1202, analyze communication 1204, and generate output 1206 based on communication 1204. In embodiments, device 1200 may be a computing device that is part of a laptop, desktop, tablet, smartphone, and/or any other device that may receive communication 1204, analyze communication 1204, and generate output 1206 based on communication 1204. In embodiments, device 1202 may be a computing device that is part of a laptop, desktop, tablet, smartphone, and/or any other device that may receive output 1206, analyze output 1206, and generate output 1208 based on output 1206.

In embodiments, communication 1204 may include microwave field information based on one or more of equations 1 to 38. In embodiments, device 1200 may receive communication 1204 and analyze communication 1204 based on one or more equations 1 to 38. In embodiments, device 1200 may generate output 1206. In embodiments, output 1206 may include electronic design information for a graphene structure. In embodiments, output 1206 may be received by device 1202. In embodiments, device 1202 may generate a physical graphene structure (e.g., graphene structure 100). In embodiments, device 1202 may include wafer fabrication systems. In embodiments, device 1202 may generate a graphene structure or a composite structure that includes a graphene structure.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 10, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices. Also it will be understood that any of the various actions can result in any type of electronic information to be displayed in real-time and/or simultaneously on multiple user devices. For FIGS. 3 to 9, the electronic graphs may be generated by a computing device, such as device 1000, and displayed via a graphical user device (GUI).

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise. Also, the phrase "converted text," or "converted information" may indicate information that has been converted from handwritten or non-handwritten information to printed information. The phrase "information" may indicate letters, words, numbers, and/or symbols. The phrase "text" may indicate letters, numbers, and/or symbols. The phrases "information" and "text" may indicate the same thing, i.e., letters, numbers, and/or symbols. Also, while the above examples are associated with prescriptions, pharmacists, and doctors, the above example actions may also be used for other scenarios and analysis of other types of handwritten text, such as with purchase orders, shipping orders, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A graphene structure comprising:
   one or more graphene layers, wherein the graphene structure:
   receives microvolts, wherein the microvolts are sent to the graphene structure via a microwave signal, and the microwave signal is received by the graphene structure at a quantum level,
   receives the microvolts at a particular cryogenic temperature,
   generates optical photons based on receiving the microvolts;
   outputs the optical photons at the quantum level, wherein:
   the graphene structure is a quantum modulator which generates the optical photons based on the received microvolts, and
   the generating the optical photons is based on a microwave frequency of different electron densities.

2. The graphene structure of claim 1, wherein:
   the multiple graphene layers have a distance, d, from each other,
   the multiple graphene layers are connected with each other in an interdigital configuration, and the graphene structure operates electronically as a capacitor and, at the same time, operates optically as a periodic medium, and wherein each of the graphene layers has an area of 1 mm$^2$.

3. The graphene structure of claim 1, where the graphene structure has multiple graphene layers, wherein each of the multiple graphene layers has a length, L, wherein the length is less than 2.0 millimeters.

4. The graphene structure of claim 1, wherein the graphene structure receives a driving voltage that is less than 10 microvolts and the particular cryogenic temperature is in milli-Kelvins.

5. The graphene structure of claim 1, wherein the graphene structure is pumped by an optical pump, wherein:
   the optical pump has an intensity level that is below a damage threshold level of the graphene structure.

6. The graphene structure of claim 1, wherein the graphene structure generates a lower sideband, wherein the lower sideband is generated based on the microwave signal modulating the graphene structure's effective permittivity.

7. The graphene structure of claim 6, wherein the graphene structure suppresses the lower sideband generated when the graphene structure is pumped by an optical pump.

8. The graphene structure of claim 7, wherein the graphene structure suppresses the lower sideband to a destruction resonance value associated with the graphene structure and wherein no reflected waves are generated at the lower sideband.

9. The graphene structure of claim 8, wherein the graphene structure generates an upper sideband at the same time that the lower sideband is generated.

10. The graphene structure of claim 9, wherein a quantum state of the upper sideband only depends on a microwave signal.

11. The electronic method of claim 1, wherein the graphene structure has multiple graphene layers that are connected to each other in an interdigital configuration.

12. The graphene structure of claim 1, wherein a conversion rate, associated with generating the optical photons from the microvolts, is based on a length of the graphene structure and the optical pump amplitude.

13. A graphene structure comprising:
    one or more graphene layers, wherein the graphene structure:
    receives microvolts, wherein the microvolts are sent to the graphene structure via a microwave signal, and the microwave signal is received by the graphene structure at a quantum level,
    receives the microvolts at a particular cryogenic temperature,
    generates optical photons based on receiving the microvolts;
    outputs the optical photons at the quantum level.

14. The graphene structure of claim 13, wherein the graphene structure has a zero magnetic susceptibility.

15. The graphene structure of claim 13, wherein each of the one or more graphene layers has a capacitance $C=2\varepsilon 0\varepsilon/d$.

* * * * *